(12) United States Patent
Kubo

(10) Patent No.: US 11,968,461 B2
(45) Date of Patent: Apr. 23, 2024

(54) IMAGE PICKUP APPARATUS

(71) Applicant: CANON KABUSHIKI KAISHA, Tokyo (JP)

(72) Inventor: Wataru Kubo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 339 days.

(21) Appl. No.: 17/534,216

(22) Filed: Nov. 23, 2021

(65) Prior Publication Data

US 2022/0166959 A1 May 26, 2022

(30) Foreign Application Priority Data

Nov. 26, 2020 (JP) .................. 2020-195658
Oct. 5, 2021 (JP) .................. 2021-163848

(51) Int. Cl.
*H04N 25/611* (2023.01)
*G02F 1/1503* (2019.01)
*G02F 1/1516* (2019.01)
*G02F 1/155* (2006.01)
*G02F 1/163* (2006.01)

(52) U.S. Cl.
CPC ......... *H04N 25/611* (2023.01); *G02F 1/1503* (2019.01); *G02F 1/1516* (2019.01); *G02F 1/155* (2013.01); *G02F 1/163* (2013.01)

(58) Field of Classification Search
CPC ... H04N 25/611; G02F 1/1503; G02F 1/1516; G02F 1/155; G02F 1/163
See application file for complete search history.

(56) References Cited

U.S. PATENT DOCUMENTS 9,766,527 B2 * 9/2017 Kubo .................. G02F 1/1533
10,303,033 B2 * 5/2019 Kubo .................. G02F 1/155

FOREIGN PATENT DOCUMENTS

JP 2016218363 A 12/2016

* cited by examiner

*Primary Examiner* — Seung C Sohn
(74) *Attorney, Agent, or Firm* — CANON U.S.A., INC. IP Division

(57) ABSTRACT

An image pickup apparatus including an electrochromic element, wherein the electrochromic element includes a complementary-type EC layer including a solvent and an anodic redox substance and a cathodic redox substance dissolved in the solvent, and image processing is performed based on a charge imbalance current flowing between a first electrode and a second electrode when a voltage lower than the voltage causing a substantial change in the transmittance of the EC layer is applied between the first electrode and the second electrode.

11 Claims, 8 Drawing Sheets

IMAGE PICKUP APPARATUS

BACKGROUND OF THE INVENTION

Field of the Invention

The present disclosure relates to an image pickup apparatus using an electrochromic element.

Description of the Related Art

A light transmittance variable element that can electrically control the transmittance of a light transmittance-reducing device, such as an ND filter, which reduces light entering the image pickup device in an image pickup apparatus, increases the degree of freedom in exposure adjustment and can perform image representation that is impossible by elements with fixed transmittance. There are several types of elements that are used as a light transmittance variable element, and among them, organic electrochromic elements (hereinafter, "electrochromic" may be referred to as "EC") have an advantage of being capable of simultaneously achieving a high achromatic and chromatic contrast and a high maximum transmittance. In this organic EC element, an organic EC compound, which is a compound having characteristics of changing the optical characteristics (absorption wavelength and absorbance) of a substance by electrochemical redox reaction, is used. When an organic EC compound is used in an image pickup apparatus, it is a challenge to suppress the influence by changes in optical characteristics with passage of time. Specifically, it is a challenge to suppress the influence on an image by achromatic defects, i.e., a change in the color of the EC element or a decrease in the transmittance under achromatic conditions, caused by continuing to exist in the chromatic state of a part of the organic EC compound even if a voltage condition that makes an EC element to be in the achromatic state is applied. As the causes of the achromatic effects, "a charge imbalance", in which the balance of giving and receiving electrons is broken by, for example, deterioration of the organic EC compound or the like contained in an EC layer, is mentioned.

In order to suppress the influence of achromatic defect due to charge imbalance, it is necessary to detect the degree of the charge imbalance. As this detection method, an optical method of primarily detecting an achromatic defect with light absorption is mentioned. However, this method requires a light source and a photographic subject serving as references, and the conditions for implementation are limited. In contrast to this, an effective electrical detection method can be easily used inside an image pickup apparatus and is therefore desirable.

Japanese Patent Laid-Open No. 2016-218363 describes that in a fixed-type EC element in which an EC compound is fixed to an electrode, an achromatic defect is detected by voltage measurement, and the achromatic defect is cancelled by applying a reverse voltage.

Although the technology described in Japanese Patent Laid-Open No. 2016-218363 is a method for detecting an achromatic defect of an EC element, the method does not detect an achromatic defect by charge imbalance but detect an achromatic defect by residual charge. In addition, this method uses a voltage generated between fixed electrodes by residual charge, which is a feature of fixed-type EC elements. In a solution-type EC element having a simpler configuration in which an EC compound is dissolved in a solvent, since such a voltage is not generated between electrodes when an achromatic defect is caused by charge imbalance, this method cannot be used.

SUMMARY OF THE INVENTION

In view of the above-described disadvantages, the present disclosure provides an image pickup apparatus that can suppress the influence of an achromatic defect by electrically detecting charge imbalance in a solution-type EC element.

The present disclosure relates to an image pickup apparatus including an electrochromic element that includes a first electrode, a second electrode, and an electrochromic layer disposed between the first electrode and the second electrode, wherein the electrochromic layer includes a solvent and an anodic redox substance and a cathodic redox substance dissolved in the solvent, and at least one of the anodic redox substance and the cathodic redox substance is an electrochromic compound. The image pickup apparatus performs image processing based on the current flowing between the first electrode and the second electrode when a voltage lower than a voltage that generates a substantial change in the transmittance of the electrochromic layer is applied between the first electrode and the second electrode.

Further features of the present disclosure will become apparent from the following description of exemplary embodiments with reference to the attached drawings.

DESCRIPTION OF THE EMBODIMENTS

The image pickup apparatus of the present disclosure includes a solution-type EC element, detects a charge imbalance current flowing between electrodes of the EC element, and performs image processing based on the current.

Regarding the configuration of the image pickup apparatus of the present disclosure, preferred exemplary embodiments will now be described in detail with reference to the drawings. However, the configurations, relative arrangements, etc. described in the embodiments are not intended to limit the scope of the present disclosure unless otherwise specified.

Figure 1:
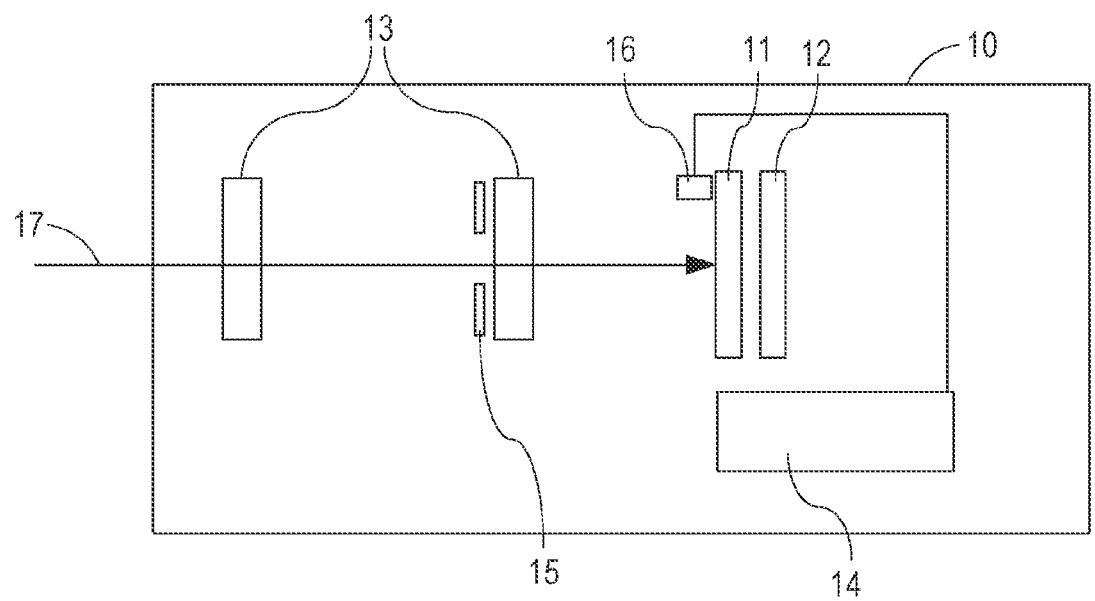
FIG. 1 is a diagram illustrating a schematic configuration of an embodiment of an image pickup apparatus of the present disclosure.

FIG. 1 is a diagram illustrating a schematic configuration of an embodiment of an image pickup apparatus of the present disclosure.

In FIG. 1, the image pickup apparatus 10 includes an EC element 11 and an image pickup device 12. Photographic subject light 17 transmitted through the EC element 11 enters the image pickup device 12 and is converted into an electric signal, which is subjected to information processing in a control unit 14 and is converted into image information such as color and intensity. The EC element 11 exhibits the function in cooperation with the control unit 14 of the image pickup apparatus 10. In addition, the image pickup apparatus 10 may include an image pickup optical system including a plurality of lenses 13 and a diaphragm 15 and an IR filter (not shown) as needed. In such a case, the photographic subject light 17 entered the image pickup apparatus 10 passes through the image pickup optical system including the plurality of lenses 13 and the diaphragm 15 and passes through the EC element 11 and the IR filter (not shown) to form an image on the image pickup device 12. In addition, the image pickup apparatus 10 may include, for example, a temperature sensor 16 acquiring temperature information of the EC element 11 and a recording device (not shown) as needed. Each component shown in FIG. 1 will now be specifically described.

Electrochromic Element

The EC element is an element of taking in light from the outside and allowing the taken light to pass through at least a part of the EC layer to change the characteristics, typically, the light intensity, of the outgoing light compared to the incident light in a predetermined wavelength region.

Figure 2:
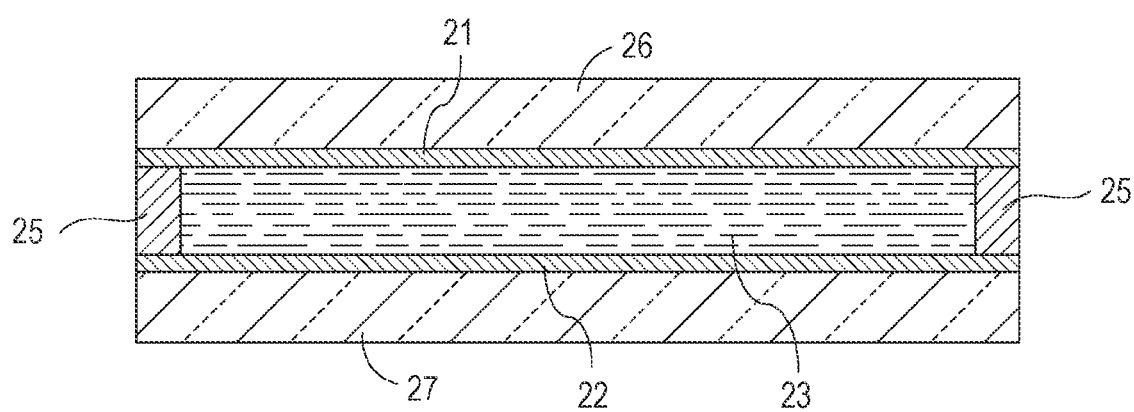
FIG. 2 is a schematic cross-sectional view illustrating an example of an EC element according to the present embodiment.

FIG. 2 is a diagram schematically illustrating a configuration of an embodiment of an EC element to be used in the present disclosure. The EC element of the present embodiment includes a first electrode 21, a second electrode 22, and an EC layer 23 disposed between these electrodes 21 and 22. The EC element of the present embodiment includes a first basal plate 26, a second basal plate 27, and a sealing material 25. The EC layer 23 includes a solvent and an anodic redox substance and cathodic redox substance dissolved in the solvent, and at least one of the anodic redox substance and the cathodic redox substance is an EC compound. A configuration in which both are EC compounds may be used.

Incidentally, the EC element of FIG. 2 is an example, and the EC element that is used in the present disclosure is not limited thereto. For example, a layer of an antireflection film may be provided between a basal plate and an electrode or between an electrode and an EC layer.

Each of the components included in the EC element will now be described.

Basal Plate

The EC element to be used in the present disclosure may include basal plates (a first basal plate 26 and a second basal plate 27). When the EC element is of a transmission type, both the basal plates 26 and 27 are transparent basal plates, and when the EC element is of a reflection type, it is necessary that at least the basal plate on the side where light enters and goes out is a transparent basal plate. Here, the term "transparent" indicates that the transmittance of light is 50% or more and 100% or less or 70% or more and 100% or less. The "light" in the present specification means light in an objective wavelength region in which the EC element is used. For example, when the EC element is used as an optical filter for the visible light region of an image pickup apparatus, the light is light in the visible light region, and the EC element is used as an optical filter for the infrared region of an image pickup apparatus, the light is light m the infrared region.

As the basal plates 26 and 27, specifically, colorless or colored glass or a transparent resin can be used. Examples of the glass include optical glass, quartz glass, white sheet glass, blue sheet glass, borosilicate glass, non-alkali glass, and chemically strengthened glass. Examples of the transparent resin include polyethylene terephthalate, polyethylene naphthalate, polynorbornene, polyamide, polysulfone, polyethersulfone, polyetherketone, polyphenylene sulfide, polycarbonate, polyimide, and polymethyl methacrylate. When a non-transparent basal plate is used, it is not particularly limited.

Electrode

As the materials constituting the electrodes (first electrode 21 and second electrode 22), materials that can stably exist in an operation environment of the EC element and allows a redox reaction to promptly proceed according to the application of a voltage from the outside may be used. As the materials constituting the electrodes, for example, transparent electroconductive materials and metals described later can be used.

At least one of the electrodes 21 and 22 may be a transparent electrode. Here, the term "transparent" indicates that the transmittance of light is 50% or more and 100% or less. When at least one of the electrodes 21 and 22 is a transparent electrode, light can be efficiently taken in from the outside of the EC element and is allowed to interact with the EC compound in the EC layer to reflect the optical characteristics of the EC compound to the outgoing light.

As the transparent electrode, for example, a film formed of a transparent electroconductive material on a basal plate or a transparent electrode formed of metal wire partially disposed on a transparent basal plate can be used. Here, although metal wire itself is not transparent, when the transmittance of light is adjusted within the above-mentioned range by partially disposing the metal wire, such an electrode is also referred to as a transparent electrode in the present disclosure.

Examples of the transparent electroconductive material include a transparent electroconductive oxide and a carbon material, such as carbon nanotubes. Examples of the transparent electroconductive oxide include tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), and niobium-doped titanium oxide (TNO). Among these oxides, ITO or FTO may be used.

When the electrode is formed of a transparent electroconductive oxide, the thickness of the electrode may be 10 nm or more and 10 μm or less. In particular, when an electrode is formed of ITO or FTO with a thickness of 10 nm or more and 10 μm or less, both high optical transparency and chemical stability can be achieved.

Incidentally, when an electrode is formed of a transparent electroconductive oxide, the electrode may have a structure composed of stacked sublayers of transparent electroconductive oxides. Consequently, high electroconductivity and high optical transparency are likely to be realized.

The metal as a material constituting an electrode is not particularly limited, and an electrochemically stable metal, such as silver (Ag), gold (Au), platinum (Pt), and titanium (Ti), may be used. The arrangement pattern of the metal wire may be a grid shape. Although the electrode including metal wire is typically a flat electrode, and a curved electrode can be used as needed.

As described above, at least one of the electrodes 21 and 22 may be a transparent electrode. When one electrode is a transparent electrode, the other electrode can be selected according to the purpose of the EC element. For example, when the EC element is a transmission-type EC element, both the electrodes 21 and 22 may be transparent electrodes. In contrast, when the EC element is a reflection-type EC element, one of the electrodes 21 and 22 is a transparent electrode, and the other may be an electrode that reflects the light taken in by the EC element. In addition, the degree of freedom of the optical characteristics of the other electrode mentioned above can be increased by forming a reflective layer or a scattering layer between the first electrode 21 and the second electrode 22. For example, when a reflective layer or a scattering layer is disposed between the first electrode 21 and the second electrode 22, as the other electrode mentioned above, an opaque electrode or an electrode that absorbs objective light may be used.

The electrodes 21 and 22 may be arranged in an arrangement system that is generally known as electrode layout of an EC element. In a typical example, a first electrode 21 formed on a first basal plate 26 and a second electrode 22 formed on a second basal plate 27 are arranged such that the first electrode 21 and the second electrode 22 face to each other with an EC layer 23 therebetween. On this occasion, the distance between the first electrode 21 and the second electrode 22 (distance between electrodes) may be 1 μm or more and 500 μm or less. The thickness of the EC layer 23 can be increased by increasing the distance between the electrodes, and an EC compound in an amount sufficient for effectively functioning as an EC element can be arranged in the EC layer 23. As a result, the transmittance at the time of coloring can be advantageously reduced. In contrast, a smaller distance between the electrodes is advantageous from the point of increasing the response speed of the EC element. As described above, a low transmittance at the time of coloring and a high responsiveness are likely to be realized by adjusting the distance between the electrodes to 1 μm or more and 500 μm or less.

Sealing Material

The sealing material 25 is a member for maintaining the distance between the electrodes (the thickness of the EC layer 23) constant. As shown in FIG. 2, the first electrode 21 and the second electrode 22 may be directly connected by the sealing material 25. Alternatively, the electrodes 21 and 22 may be formed to be smaller than the basal plates 26 and 27 to connect the first basal plate 26 and the second basal plate 27.

The sealing material 25 may be made of a material that is chemically stable, is unlikely to transmit gas and liquid, and does not prevent the redox reaction of an EC compound. For example, an inorganic material, such as glass frit, an organic material, such as epoxy and acrylic resins, and a metal can be used. Incidentally, the sealing material 25 may have a function of maintaining the distance between the first electrode 21 and the second electrode 22 by, for example, containing a spacer material. In this case, the first electrode 21, the second electrode 22, and the sealing material 25 can form a space for locating the EC layer 23 between the electrodes 21 and 22.

When the sealing material 25 does not have a function of regulating the distance between the first electrode 21 and the second electrode 22, a spacer having a function of regulating and maintaining the distance between the electrodes may be specially arranged. As the material of the spacer, an inorganic material, such as silica beads and glass fiber, or an organic material, such as polyimide, polytetrafluoroethylene, polydivinylbenzene, fluororubber, and epoxy resin, can be used.

Electrochromic Layer

The EC layer 23 includes a solvent and at least one of an anodic EC compound and a cathodic EC compound. The EC layer 23 is a layer in which an anodic EC compound and a cathodic EC compound are dissolved in a solvent. The EC layer 23 may further contain an additive, such as a supporting electrolyte and a thickener.

Solvent

The solvent can be appropriately selected according to the purpose in consideration with the solubility, vapor pressure, viscosity, potential window, etc. of the solutes, such as the anodic EC compound and the cathodic EC compound, to be used. The solvent may be that capable of dissolving the anodic EC compound and the cathodic EC compound to be used. The solvent may be a solvent having polarity, and examples thereof include organic polar solvents, such as an ether compound, a nitrile compound, an alcohol compound, dimethyl sulfoxide, dimethoxyethane, sulfolane, dimethylformamide, dimethylacetamide, and methylpyrrolidinone, and water. Among these solvents, the solvent may be a solvent having a cyclic ether, such as propylene carbonate, ethylene carbonate, γ-butyrolactone, valerolactone, and dioxolane. These solvents having cyclic ethers can be used from the viewpoint of the solubility, boiling point, vapor pressure, viscosity, and potential window of the EC compound. In particular, a solvent having propylene carbonate or γ-butyrolactone among the cyclic ethers can be used. Alternatively, ionic liquid can also be used as the solvent.

The solvent may further contain a polymer, a gelling agent, or a thickener to increase the viscosity of the EC layer 23 or gelling the EC layer 23. As the solvent or the electrolytic solution, a polymer electrolyte or a gel electrolyte may be used. The polymer is not particularly limited, and examples thereof include polyacrylonitrile, carboxymethyl cellulose, polyvinyl chloride, polyethylene oxide, polypropylene oxide, polyurethane, polyacrylate, polymethacrylate, polyamide, polyacrylamide, polyester, Nafion (registered trademark), and derivatives thereof. When the EC layer 23 is increased in viscosity or is gelled, the movement of the EC compound in the EC layer 23 is suppressed. Consequently, vertical color separation is further suppressed from occurring.

The EC layer 23 may further include a supporting electrolyte. The supporting electrolyte is not particularly limited as long as it is an ion dissociable salt having good solubility in the solvent. The supporting electrolyte can be a material that is stable at the operation potential of the EC element. As the supporting electrolyte, a combination of a cation and an anion suitably selected from various ions can be used. Examples of the cation include metal ions, such as an alkali metal ion and an alkaline earth metal ion; and organic ions, such as a quaternary ammonium ion.

Specifically, examples of the cation include $Li^+$, $Na^+$, $K^+$, $Ca^{2+}$, $Ba^{2+}$, a tetramethylammonium ion, a tetraethylammonium ion, and a tetrabutylammonium ion. Examples of the anion include anions of various fluorine compounds and halide ions, specifically. $ClO_4^-$, $SCN^-$, $BF_4^-$, $AsF_6^-$, $CF_3SO_3^-$, $CF_3SO_2NSO_2CF_3^-$, $PF_6^-$, $I^-$, $Br^-$, and $Cl^-$. When a salt compound is used as the EC compound, the EC compound may also function as a supporting electrolyte. Examples of the salt compound as the EC compound include a viologen derivative.

The method for forming the EC layer 23 is not particularly limited, and examples thereof include a method by injecting a solution containing a solvent and an EC compound into a gap provided between the first electrode 21 and the second electrode 22 by, for example, a vacuum injection method, an atmospheric injection method, or a meniscus method. Specifically, for example, a liquid containing a solvent and an EC compound is injected into a cell formed by electrodes 21 and 22 and a sealing material 25 from an opening portion (not shown) formed in a part of any of the electrodes 21 and 22 and the sealing material 25, and the opening portion is sealed with a sealing member.

Redox Substance and EC Compound

In the present disclosure, the EC layer 23 includes a solvent, an anodic redox substance, and a cathodic redox substance and suppresses the influence on images by an achromatic defect due to charge imbalance of an EC element called a complementary type in which at least one of the anodic redox substance and the cathodic redox substance is an EC compound, i.e., any of the following combinations (i) to (iii):

(i) an anodic EC compound and a cathodic redox substance;
(ii) a cathodic EC compound and an anodic redox substance; and
(iii) an anodic EC compound and a cathodic EC compound.

Among these combinations, the configuration of (iii) that can increase the achromatic and chromatic contrast may be used.

In the present specification, the "redox substance" is a compound that can be repeatedly redoxed in a predetermined potential range, and inorganic and organic compounds can be used without limitation. In particular, from the compatibility with the usage environment, an organic compound may be used. In the present specification, a redox substance may be referred to as an anodic or cathodic redox substance. This anodic redox substance is usually a substance that is in a reduced state when a driving voltage is not applied to the element and is in an oxidized state when a driving voltage is applied to the element. The cathodic redox substance is usually a substance that is in an oxidized state when a driving voltage is not applied to the element and is in a reduced state when a driving voltage is applied to the element.

In the present specification, the "EC compound" is one of redox substances and is a compound whose optical characteristics change by a redox reaction in the target light wavelength region of the EC element. Incidentally, the optical characteristics are light absorption characteristics and light reflection characteristics, typically, light absorption characteristics. The EC compound can also be said to be a compound whose light transmittance changes by a redox reaction in the target light wavelength region of the EC element. Here, the phrase "optical characteristics change" typically indicates that the light absorbing state and the light transmitting state are switched to each other. In this case, the EC compound can also be said to be a compound whose light absorbing state and light transmitting state are switched to each other by a redox reaction.

In the present specification, the term "anodic EC compound" refers to an EC compound whose optical characteristics change by an oxidation reaction in the target light wavelength region of the EC element when the EC element is driven. The oxidation reaction is generally a reaction of eliminating electrons from the EC compound. In the present specification, the term "cathodic EC compound" refers to an EC compound whose optical characteristics change by a reduction reaction in the target light wavelength region of the EC element when the EC element is driven. The reduction reaction is generally a reaction of donating electrons to the EC compound. A typical example of the anodic EC compound is a compound that changes from a light transmitting state to a light absorbing state by an oxidation reaction when the EC element is driven. A typical example of the cathodic EC compound is a compound that changes from a light transmitting state to a light absorbing state by a reduction reaction when the EC element is driven. The anodic and cathodic EC compounds are not limited thereto and may be respectively compounds that change from a light absorbing state to a light transmitting state by an oxidation reaction or a reduction reaction when the EC element is driven. In the following description, in order to make it easier to imagine changes in the light absorption characteristics of the EC compound, as a typical example, an example in which a light transmitting state (achromatic state) changes to a light absorbing state (chromatic state) when the EC element is driven will be described.

The anodic EC compound and the cathodic EC compound both assume at least two states different from each other due to an oxidation reaction or a reduction reaction caused by controlling the voltage to be applied between the first electrode 21 and the second electrode 22 or switching ON and OFF of the EC element. In the present specification, a state in which an EC compound is oxidized by an oxidation reaction of one or more electrons is called an "oxidized form" of the EC compound, and a state in which an EC compound is reduced by a reduction reaction of one or more electrons is called a "reduced form" or the EC compound. That is, the anodic EC compound is in the reduced form when the EC element is not driven and partially becomes the oxidized form when the EC element is driven. The cathodic EC compound is in the oxidized form when the EC element is not driven and partially becomes the reduced form when the EC element is driven.

Incidentally, some literatures express the states of an EC compound such as that the oxidized form changes to the reduced form (or vice versa) through the neutral form. However, in the following description, basically, expression of an oxidized form and a reduced form are adopted under the recognition that the reduced form is produced when the oxidized form is reduced and that the oxidized form is produced when the reduced form is oxidized. For example, ferrocene (neutral form as a whole molecule) having divalent iron is the reduced form of ferrocene (anodic redox substance) when the ferrocene functions as an anodic redox substance. When this reduced form is oxidized into a trivalent ion form (ferrocenium ion), the ferrocenium ion is the oxidized form, in particular, the primary oxidized form, of ferrocene (anodic redox substance). When a dication salt of viologen functions as a cathodic EC compound, the dication salt is the oxidized form of the cathodic EC compound. A monocation salt obtained by one electron reduction of the dication salt is the reduced form, in particular, the primary reduced form, of the cathodic EC compound.

The EC compound according to the present disclosure may be an organic compound. The organic compound may be a low molecular organic compound or a high molecular organic compound and can be a low molecular organic compound having a molecular weight of 2000 or less. The anodic EC compound and the cathodic EC compound both may be compounds each changing from an achromatic form to a chromatic form by driving of the EC element. Incidentally, the EC compound may be composed of a plurality of anodic EC compounds and a plurality of cathodic EC compounds.

Examples of the anodic EC compound include a thiophen derivative, amines having aromatic rings (for example, a phenazine derivative and a triallylamine derivative), a pyrrole derivative, a thiazine derivative, a triallylmethane derivative, a bisphenylmethane derivative, a xanthene derivative, a fluorane derivative, and a spiropyran derivative. Among these examples, the anodic EC compound may be an amine having a low molecular aromatic ring, such as a dihydrophenazine derivative.

This is because when these compounds are used as the EC compound, an EC element having a desired absorption wavelength profile is likely to be provided, and high durability against repeated use is obtained. Each of these compounds has an absorption peak in the ultraviolet region in the neutral state (reduced form), does not have absorption in the visible light region, and assumes the achromatic state with high transmittance in the visible light region. When these molecules become radical cations (oxidized form) by an oxidation reaction, the absorption peak shifts to the visible light region to become the chromatic state. These molecules can arbitrarily design the absorption wavelength by increasing or decreasing the n conjugation length or changing the n conjugation system through modification of the substituent. Here, the term "low molecular" refers to that the molecular weight excluding the counter ion is 2000 or less.

The cathodic EC compound is not particularly limited, and examples thereof include pyridine derivatives, such as a viologen derivative, and quinone compounds. Among these examples, a pyridine derivative, such as a viologen derivative, may be used.

Accordingly, the cathodic EC compound may be a compound having a pyridine skeleton or a quinone skeleton. The cathodic EC compound may be a compound represented by the following general formula (1):

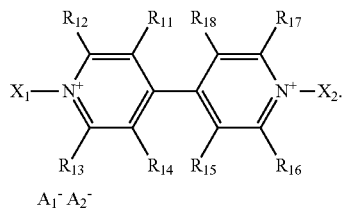

In the general formula (1), $X_1$ and $X_2$ are each independently selected from an alkyl group, an aralkyl group, and an aryl group. The alkyl group, the aralkyl group, and the aryl group may have substituents. $R_{11}$ to $R_{18}$ are each independently a hydrogen atom, an alkyl group, an aralkyl group, an alkoxy group, an aryl group, a heterocyclic group, a substituted amino group, a halogen atom, or an acyl group. The alkyl group, the alkoxy group, the aralkyl group, the aryl group, and the heterocyclic group may have substituents. $A_1^-$ and $A_2^-$ each independently represent a monovalent anion.

Balance/Imbalance of Charge

A concept of balance/imbalance of charge will now be described with reference to the drawings.

Figure 3A:
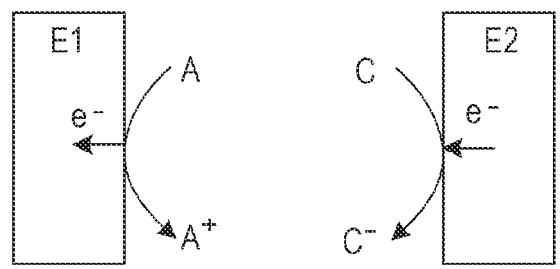
FIGS. 3A to 3C are diagrams explaining a mechanism of generating a charge imbalance current.
Figure 3B:
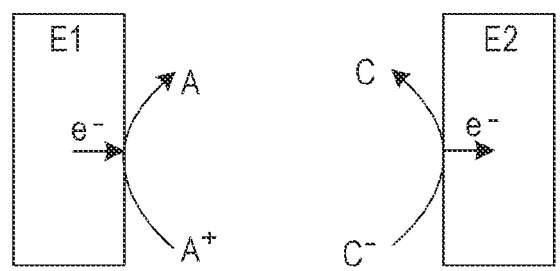
Figure 3C:
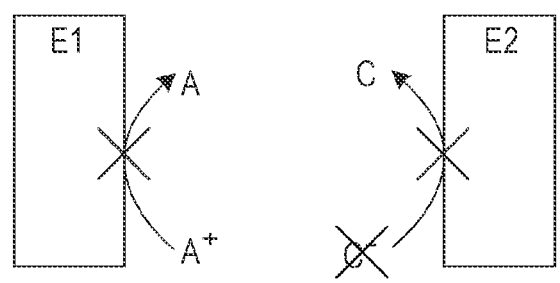

FIGS. 3A to 3C are diagrams explaining the concept of balance/imbalance of charge. Incidentally, FIGS. 3A to 3C show a complementary-type EC element of which the system uses both an anodic EC compound and a cathodic EC compound. In FIGS. 3A to 3C, a first electrode E1 functioning as an anode and a second electrode E2 functioning as a cathode are shown. In FIGS. 3A to 3C, A is the reduced form (achromatic state) of an anodic EC compound, $A^+$ is the oxidized form (chromatic state) of the anodic EC compound. In FIGS. 3A to 3C, C is the oxidized form (achromatic state) of a cathodic EC compound, and $C^-$ is the reduced form (chromatic state) of the cathodic EC compound.

FIG. 3A is a diagram showing a coloring process of an EC element. When a coloring voltage is applied between the first electrode E1 and the second electrode E2, an oxidation reaction shown in the following ($\alpha$) of the anodic EC compound A proceeds at the first electrode E1, and a reduction reaction shown in the following ($\beta$) of the cathodic EC compound C proceeds at the second electrode E2.

$$A \rightarrow A^+ + e^- \quad (\alpha)$$

$$C + e^- \rightarrow C^- \quad (\beta)$$

These reactions proceed to make the EC layer to be in the chromatic state.

FIG. 3B is a diagram showing a decoloring process, which is a reverse process of the coloring process. When the EC layer is decolored, reverse reactions of the reactions shown in FIG. 3A proceed, as shown by arc shaped arrows in FIG. 3B, by applying a decoloring voltage (for example, short circuit (0 V)) between the first electrode E1 and the second electrode E2. Consequently, the EC compound in the chromatic state can be restored to the achromatic state.

When the reactions shown in FIGS. 3A and 3B are repeated, the balance of charge of the EC element is normal, and the element repeats coloring and decoloring normally.

On the other hand, when the EC element is continued to be driven, a process other than the normal coloring and decoloring may be partially performed to collapse the balance of charge. Although there are several types of causes of this, here, deterioration in the reduced form of a cathodic EC compound will be described by FIG. 3C as an example.

When the reduced form C of the cathodic EC compound colored through a normal coloring step is deteriorated and becomes impossible to react at the second electrode E2, the oxidized form $A^+$ of the anodic EC compound loses the supply source of electrons also at the first electrode E1 and becomes impossible to react. Incidentally, in the following description, such a phenomenon is called collapse of the balance of charge, i.e., charge imbalance. As a result of occurrence of charge imbalance, this EC element shows an achromatic defect in which the chromatic form of the anodic EC compound remains, even though the anodic EC compound is normal.

Examples of the cause of charge imbalance include an irreversible electron transfer reaction (in particular, an electrode reaction) of a substrate for the redox reaction, specifically, impurities (derived from an EC compound, environmental impurities (oxygen, water, etc.), and derived from a sealing material) and a chemical reaction between radicals. Among these causes, typical two causes are as follows. The first one is irreversible reduction of oxygen infiltrated into the EC element, in this case, an achromatic defect due to remaining of the chromatic form of an anodic EC compound is present. The second one is reducible impurities included in the EC compound and the sealing material, in this case, an achromatic defect due to remaining of the chromatic form of a cathodic EC compound is present.

Method for Detecting Charge Imbalance Based on Current

In order to suppress the influence of an achromatic defect due to charge imbalance, it is necessary to detect the achromatic defect. The detection method may detect the chromatic form of an EC compound remaining at the time of decoloring of the EC element. Accordingly, as a first method, an optical method is mentioned. When the optical method is used, since a light source and a photographic subject are necessary as reference, although it is easy to perform at a service center or the like, the applicable equipment sizes and facilities, etc. are limited, for example, when processing is performed inside an image pickup apparatus. In contrast to this, if there is an electrical detection method, it can be easily used inside an image pickup apparatus. Accordingly, as a method for detecting charge imbalance in the present disclosure, an electrical detection method is selected.

The mechanism of the method for electrically detecting charge imbalance in the present disclosure will now be described. In a normal (ideal) EC element in a state of not being applied with a voltage (achromatic state in many cases), the reduced form of an anodic redox substance (including EC compound) and the oxidized form of a cathodic redox substance (including EC compound) are present, the oxidized form of the anodic redox substance and the reduced form of the cathodic redox substance are almost not present. However, in the EC layer in the charge imbalance state, the oxidized form of the anodic redox substance or the reduced form of the cathodic redox substance remains due to the charge imbalance. When they are EC compounds, they remain in the chromatic state to cause an achromatic defect. In this state, the oxidized form and the reduced form of the same EC compounds are simultaneously present in the EC solution in a single EC layer. Here, in the case of a solution-type EC element in which the EC compound is not fixed to an electrode, the EC compound can freely move in the EC layer. As a result, a reaction of the oxidized form and the reduced form of the same (or homopolar) EC compounds (redox substances) can proceed at a pair of electrodes. Here, in the EC element, as the EC compound used in the EC layer or the redox substance, a substance having high reversibility of redox reaction is selected for securing the durability of the EC element. Accordingly, the reaction of the oxidized form and the reduced form of the sane (or homopolar) EC compounds (redox substances) proceeds with only a sight overvoltage.

Figure 4A:
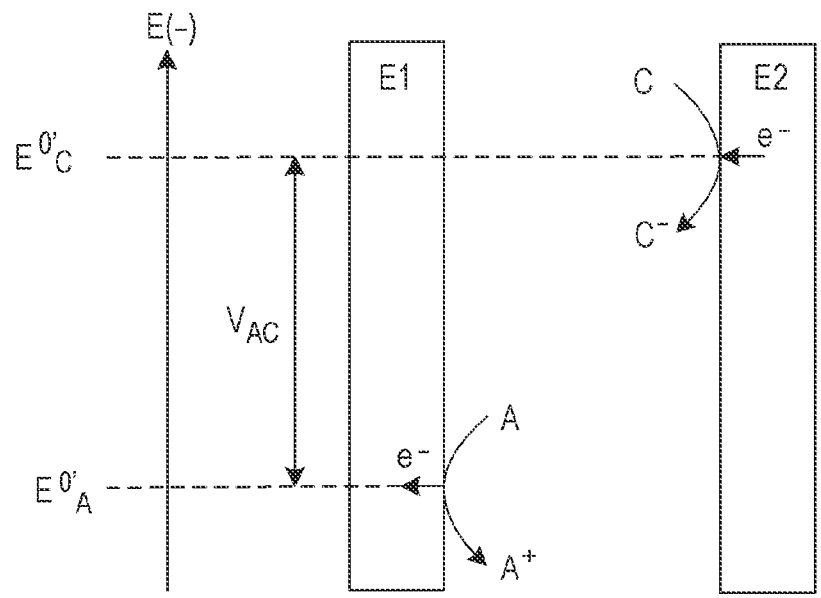
FIGS. 4A and 4B are diagrams showing a relationship between the reaction of an oxidized form and a reduced form in charge imbalance and the voltage.
Figure 4B:
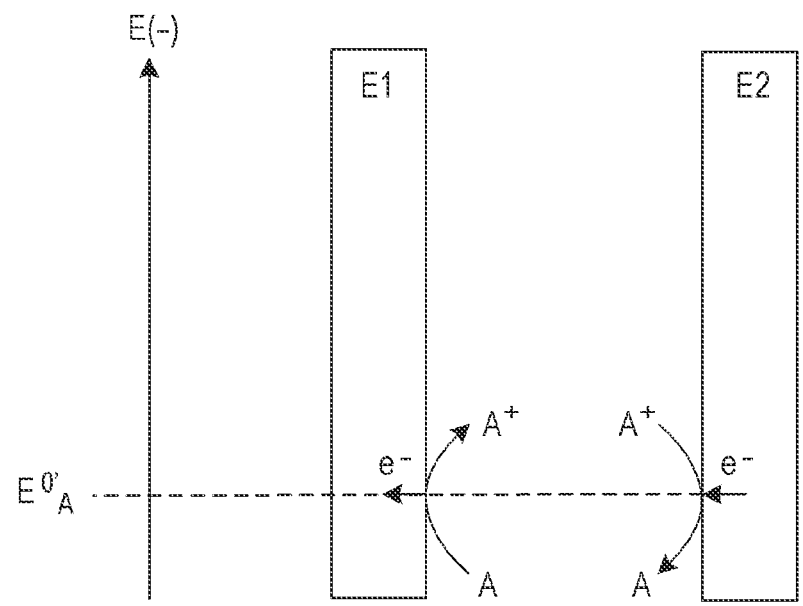

A relationship between this reaction and the voltage will be described using FIGS. 4A and 4B. FIGS. 4A and 4B are potential diagrams, and the vertical axis is potential (the upper part is negative). FIG. 4A shows a potential diagram at the time of coloring of an EC element. The oxidation reaction of an anodic EC compound proceeds at the first electrode E1 to change the achromatic form to the chromatic form $A^+$, and the reduction reaction of a cathodic EC compound proceeds at the second electrode E2 to change the cathodic EC compound from the achromatic form to the chromatic form $C^-$. In order to allow this reaction to proceed, it is necessary to apply an overvoltage for allowing the reaction to proceed, in addition to the difference $V_{AC}$ between the redox potential ($E^{0'}_A$) of an anode material and the redox potential ($E^{0'}_C$) of a cathode material located more negative than the anode material. (When the $V_{AC}$ is not sufficiently large, the coloring reaction proceeds even if a voltage is not applied from the outside to disadvantageously provide an EC element with a low transmittance.) In contrast to this, FIG. 4B shows a potential diagram of an EC element in which the anodic EC compound remains as an achromatic defect, as an example. At this time, the reduced form (achromatic form) A and the oxidized form (chromatic form) $A^+$ of the anodic EC compound are present in the EC layer. (The oxidized form (achromatic form) C of a cathodic redox substance (including EC compound) is also present, which is omitted in the diagram.) On this occasion, an oxidation reaction of the reduced form A of the anodic EC compound to the oxidized form $A^+$ is performed at the first electrode E1, and at the second electrode E2, reversely, a reduction reaction of the oxidized form $A^+$ of the anodic EC compound to the reduced form A is performed. This reaction has the following two characteristics.

(1) Since the compounds are same, the reaction is a redox reaction with high reversibility of the compounds having the same redox potential and proceeds with only a low overvoltage without requiring application of a large voltage, such as $V_{AC}$.

(2) Since the oxidation reaction (in the example of FIG. 4B, a coloring reaction) and the reduction reaction (in the example of FIG. 4B, a decoloring reaction) of the same compounds simultaneously proceed, the colored part and the decolored part are offset, and the light absorption of the EC layer does not change by progress of the reaction.

As a result, in the EC element having charge imbalance, even when a low voltage, such as a voltage lower than that of causing a substantial change in the transmittance of the EC layer, is applied between the first electrode E1 and the second electrode E2, an electrode reaction of the chromatic form of the EC compound generated by charge imbalance and an electrode reaction of the achromatic form of the compound are caused to allow a current to flow. This current is called a charge imbalance current in the present specification.

The diffusion limited current, ilim, in a thin layer cell having a distance between electrodes of d is represented by, as defined by Fick's first law, the following expression $$ilim = 2nAFDc/d. \qquad (1):$$

Here, n is the number of electrons participating in reaction, A is the electrode area, F is the Faraday constant, D is the diffusion coefficient, and c is the concentration of the reactant. Here, when the achromatic defect can be delt with the image processing by the image pickup apparatus, the concentration of the chromatic form EC compound remaining in the achromatic state is sufficiently lower than the concentration of the EC compound present in the achromatic form. (Significant charge imbalance color remaining in which the concentration of the chromatic form EC compound is equivalent to or higher than the concentration of the EC compound present in the achromatic form is difficult to be delt with only image processing by the image pickup apparatus.) Accordingly, the charge imbalance current is restricted by diffusion of the chromatic form EC compound remaining in the achromatic state of the EC element of which the concentration is relatively low. As a result, the charge imbalance current is proportional, according to the expression (1), to the concentration of the chromatic form EC compound remaining in the achromatic state of the EC element of which the concentration is low. In addition, the charge imbalance current is proportional to the diffusion coefficient according to the expression (1). When the temperature rises, the viscosity of the solution changes (usually decreases), and the diffusion coefficient changes (usually increases). Accordingly, the value of the charge imbalance current is affected by the temperature. Accordingly, in order to detect the degree of charge imbalance, the relationship between the charge imbalance current and the temperature is measured in advance, and the degree of charge imbalance may be calculated using the value obtained by correcting the charge imbalance current using the relationship.

It is known that the diffusion coefficient changes depending on a change in temperature. Accordingly, the image pickup apparatus of the present disclosure preferably includes a temperature sensor for detecting the temperature of the EC element to perform image processing based on the temperature and current. As a relationship between the diffusion coefficient and the temperature, the Arrhenius equation (2) is known. Here, Do is a constant, Q is an activation energy, R is a gas constant, and T is an absolute temperature.

$$D=D_0 \exp(-Q/RT) \quad (2)$$

As shown by the above equation (2), the diffusion coefficient generally increases as the temperature rises. Since the degree of temperature change of the current often differs depending on the EC layer, it is preferable to previously measure the temperature dependence of current in the EC layer to be used and to correct the temperature change based on the result. Specifically, for example, a temperature correction coefficient is calculated from the temperature dependence of the current flowing in the EC layer and is kept, the temperature correction of the current value is performed by referring to the temperature correction coefficient, and image processing is performed by referring to the corrected value.

Image Pickup Device

The image pickup device 12 of FIG. 1 performs photoelectric conversion of an image formed on the surface of the device and can use, for example, a CCD (Charge-Coupled Device) or a CMOS (Complementary Metal-Oxide-Semiconductor field-effect transistor) device. In the CMOS device, the MOS transistor of the area sensor unit and peripheral circuits such as a driving circuit and an A/D conversion circuit can be simultaneously formed by a single step. Accordingly, the number of masks and the processing step can be significantly reduced compared to the CCD. In addition, it is possible to randomly access to an arbitrary pixel, to easily read out by thinning out for display, and to perform real-time display with a high display rate. As the image pickup device that is used in the image pickup apparatus of the present disclosure, an image pickup device that acquires signals for light of at least three colors R, G, and B is preferably used.

Control Unit

The control unit 14 of FIG. 1 controls each unit of the image pickup apparatus 10 by implementing a program set in advance. The control unit 14 performs digital image signal (image data) conversion of an analog image signal output from the image pickup device 12 through an A/D converter, signal processing for a series of image data, such as gain adjustment, demosaic processing, gamma correction, color conversion, and color correction, exposure control, focusing control, and white balance control. This control unit also controls the transmittance of the EC element 11. In addition, the condition for controlling the transmittance of the EC element 11 may also be changed based on the information from the temperature sensor 16 that measures the temperature of the EC element 11. This function of the control unit 14 may be performed by an integrated control unit or may be performed in a distributed manner with several sites (with different names).

The image pickup apparatus of the present disclosure is characterized by measuring the current that flows between the first electrode and the second electrode of an EC element 11 when a voltage that is lower than the voltage causing a substantial change in the transmittance of the EC layer is applied between the first electrode and the second electrode and performing image processing based on the current. The control unit 14 performs a series of operations of voltage application to the EC element 11, current measurement, and image processing.

Charge Imbalance and Image Processing for Compensating it

Occurrence of Charge Imbalance Achromatic Defect

Although the causes of a charge imbalance achromatic defect are as described in the above paragraph "Balance/imbalance of charge", the color and the degree (the spectrum of light absorption remaining at the time of an achromatic defect) change depending on the EC element and the driving conditions thereof. Specifically, the color and the degree change by, for example, the configuration (electrodes and sealing material) of the EC element, the EC compound (type and concentration), impurities, and driving conditions (temperature, humidity, application voltage, voltage application time, and pattern). Here, an anodic achromatic defect in which an anodic EC compound remains in a chromatic form will be described by a high-temperature high-humidity drive test, as an example. When an anodic achromatic defect occurs, a spectrum of the chromatic form of the anodic EC compound remains.

Detection of Charge Imbalance

Figure 5A:
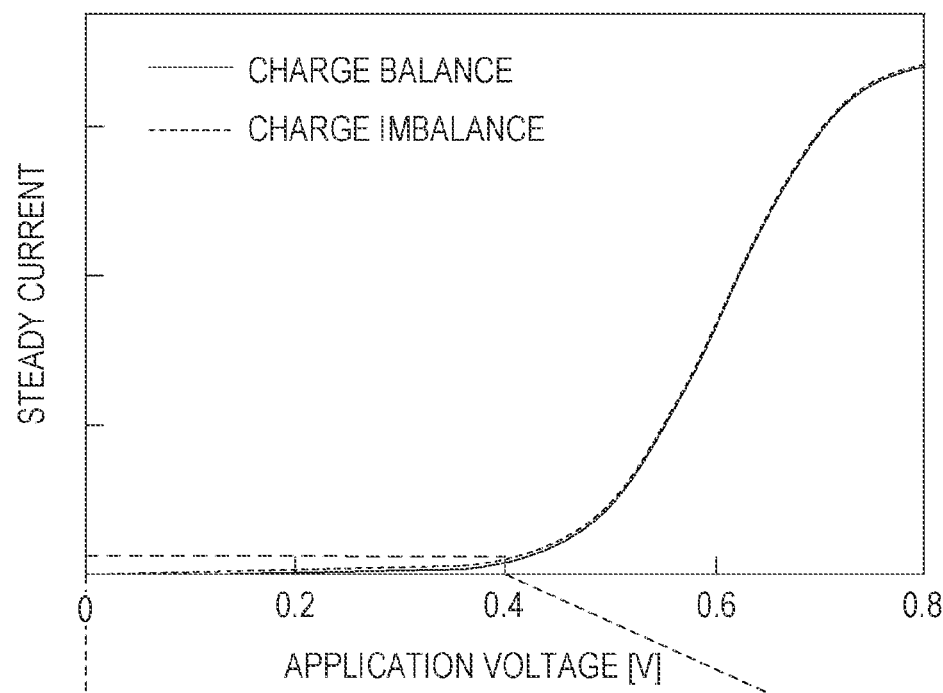
FIGS. 5A and 5B are graphs showing an example of characteristics of steady currents in a charge balance state and a charge imbalance state of an EC element when a voltage is applied.
Figure 5B:
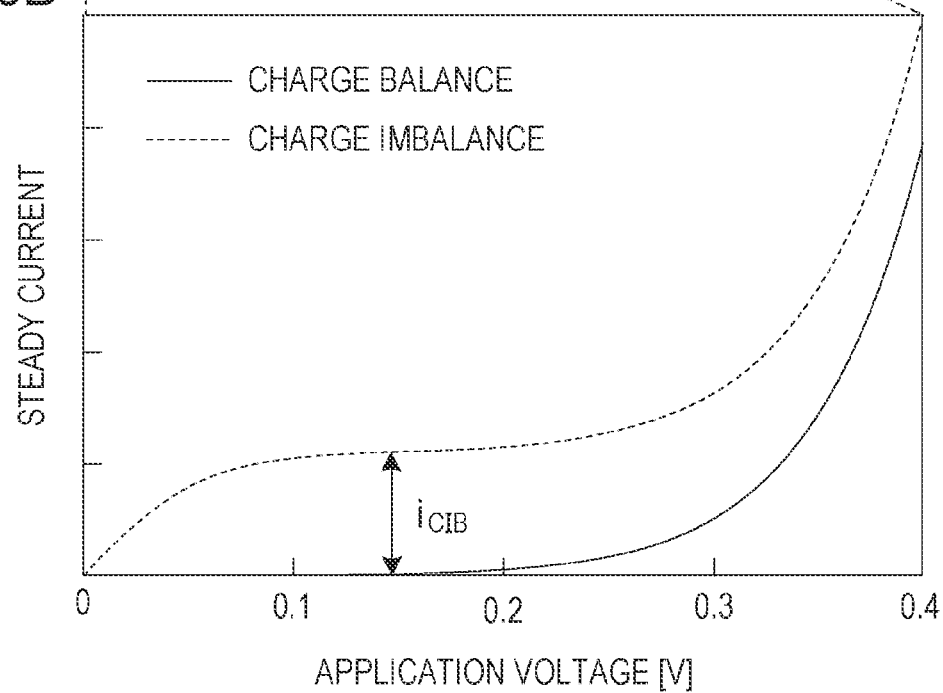

In the EC element in a charge imbalance state, as described in the above paragraph "Method for detecting charge imbalance based on current", a charge imbalance current flows. FIGS. 5A and 5B show an example of characteristics of steady currents in a charge balance state and a charge imbalance state of an EC element when a voltage is applied. The horizontal axes of FIGS. 5A and 5B indicate the voltage applied between the first electrode and the second electrode, and the vertical axes indicate the steady current when the voltage is applied. It is demonstrated by FIG. 5A that this EC element shows a sigmoidal shaped profile in which the current of a coloring reaction of the EC element rises at before 0.4 V and increases over 0.8 V. An enlarged view of the low voltage range before 0.4 V is shown in FIG. 5B. Almost no current flows up to around 0.2 V in the EC element in the charge balance state. In contrast, in the EC element in the charge imbalance state, a constant current is observed from 0.1 V to 0.2 V. This is a charge imbalance current (iCIB). Accordingly, the charge imbalance current can be measured in a voltage range where the influence of the current of the coloring reaction is small, i.e., a voltage lower than the voltage causing a substantial change in the transmittance of the EC layer. As examples of this voltage range, three examples: a method of setting from the maximum absorbance change of an EC element, a method of setting from the absorbance change-current profile, and a method of setting from the half wave potential difference of the redox reaction relating to coloring and decoloring of an EC compound, will be described.

As the method for setting from the maximum absorbance change of an EC element, a voltage range giving an absorbance change of $1/100$ or less, or $1/1000$ or less, of the maximum absorbance of an EC element is mentioned.

Figure 6A:
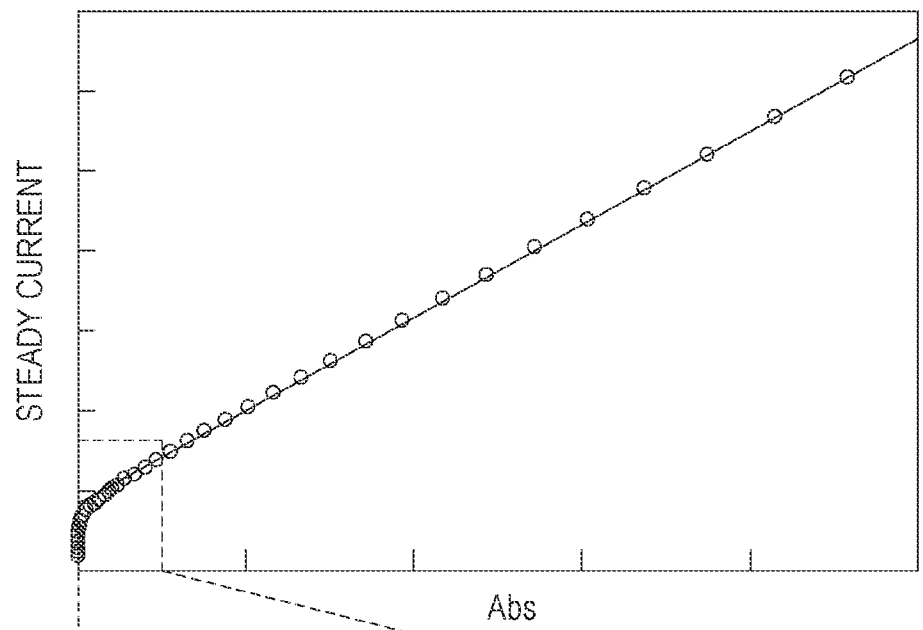
FIGS. 6A and 6B are graphs showing an example of an absorbance change-steady current profile of an EC element in a charge imbalance state.
Figure 6B:
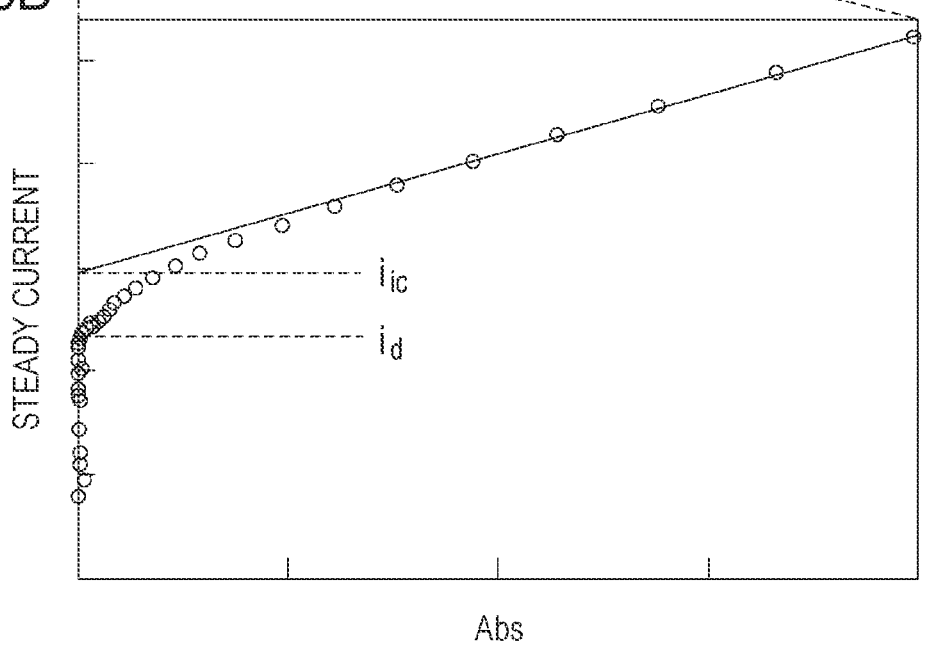

The method of setting from an absorbance change-current profile will now be described. FIGS. 6A and 6B show an example of an absorbance change-steady current profile of an EC element in a charge imbalance state. In FIGS. 6A and 6B, the horizontal axes indicate the absorbance change (Abs), and the vertical axes indicate the steady current. Many of EC elements show a linear absorbance change-steady current profile. The voltage range of lower than a voltage giving a steady current (iic) that is the ordinate intercept of this straight line can be a voltage range of lower than a voltage causing a substantial change in the transmittance of the EC layer. In addition, as shown in FIGS. 6A and 6B, when the steady current is measured at constant voltage steps, the current (id) at which the density of points of the steady current becomes the highest may be used as the value of the charge imbalance current.

The method of setting from the half wave potential difference of the redox reaction relating to coloring and decoloring of an EC compound will now be described. As the half wave potential of the redox reaction relating to coloring and decoloring of an EC compound, the value obtained by subtracting a predetermined value (e.g., 0.3 V) from the absolute value of the difference between the value of the anodic EC compound and the value of the cathodic EC compound is mentioned. In an example of using a dihydrophenazine derivative as the anodic EC compound and using a viologen derivative as the cathodic EC compound, the half wave potential may be 0.5 V or less, or 0.3 V or less.

The lower limit of the voltage applied when the charge imbalance is detected will be described. In measurement of a constant charge imbalance current, when the absolute value of the voltage is larger than zero, a charge imbalance current proportional to the concentration is observed. Accordingly, the absolute value of the voltage to be applied when charge imbalance is detected can be larger than zero. In further clearly observe a charge imbalance current, an overvoltage sufficient for allowing the reaction of the EC compound remaining at the time of decoloring to proceed may be applied. As (the absolute value of) this voltage, specifically, 57 mV, which is an ideal value of the voltage between peaks of a cyclic voltammogram, or more is mentioned as an example of the overvoltage for sufficiently oxidizing and reducing a reversible redox substance. Consequently, it is possible to provide an overvoltage sufficient for allowing the reaction of the EC compound remaining at the time of decoloring to proceed. When charge imbalance is detected by applying an AC voltage and measuring, for example, the charge transfer resistance from the current response at that time, a sufficient overvoltage, such as a steady current, need not be applied. In a charge imbalance state, since not a small exchange current is flowing, charge imbalance can be detected with an application voltage smaller than that when the steady current is measured. The application voltage at this time may be larger than zero as the absolute value. As a specific example, several to several tens of millivolts are mentioned.

When charge imbalance is detected, a transitional current response can also be used instead of the steady current. For example, since the transient current by stepping potential is proportional to the concentration of a substrate (here, the chromatic form of an EC compound remaining at the time of decoloring), charge imbalance can also be detected by measuring the transient current. When the chromatic form of an EC compound remains at the time of decoloring, since the chromatic form and the achromatic form of the EC compound are present in the EC layer, the charge transfer resistance at the time of applying a voltage is decreased. This is because, as shown in FIGS. 4A and 4B, a current flows with a slight voltage since a redox reaction of the same materials proceeds at electrodes facing each other. Accordingly, charge imbalance can also be detected by applying an AC voltage and measuring the charge transfer resistance from the current response at that time. In also these cases, charge imbalance may be detected by applying a voltage lower than the voltage causing a substantial change in the transmittance of the EC layer. In the EC layer in a state with no charge imbalance, as shown in FIG. 4A, a substrate that reacts when a large voltage is applied is present, but a substrate that reacts when a small voltage lower than the voltage causing a substantial change in the transmittance of the EC layer is applied is almost not present. Accordingly, when a small voltage lower than the voltage causing a substantial change in the transmittance of the EC layer is applied, charge transfer (electrode reaction) hardly proceeds. Accordingly, when a small voltage is applied by alternating current, the charge transfer resistance thereof is observed as a large value. In contrast, in the EC layer in a charge imbalance state, as shown in FIG. 4B, since a substrate that reacts at a slight potential difference (voltage) is present at both the anode and the cathode, even when a small voltage lower than the voltage causing a substantial change in the transmittance of the EC layer is applied, charge transfer (electrode reaction) proceeds. Accordingly, even when a small voltage is applied by alternating current, the charge transfer resistance is observed as a relatively small value. Thus, charge imbalance can be detected by applying an AC voltage and measuring the charge transfer resistance from the current response at that time. The charge transfer resistance can be estimated from the diameter of the arc that appears in Nyquist plots of impedances measured by changing the frequency. Practically, it is preferable to measure the frequencies that give plots corresponding to an arc diameter in advance and to estimate the charge transfer resistance from the impedance difference at those frequencies.

Relationship Between Charge Imbalance and Image Processing

It is possible to suppress the influence of an achromatic defect on an image picked up with an image pickup apparatus by detecting charge imbalance and compensating the achromatic defect of the EC element. As the method for the compensation, image processing is performed in the present disclosure. This image processing compensates an achromatic defect of the EC element by charge imbalance and therefore compensates the light absorption of the anodic EC compound or the cathodic EC compound. The absorbance of this light absorption is proportional to the concentration of the charge imbalance, i.e., the remaining chromatic form of the EC compound and is therefore proportional to the charge imbalance current. Accordingly, this image processing may compensate the remaining light absorption of the EC compound in an amount proportional to the charge imbalance current.

The EC element of the present disclosure may use a low molecular organic EC compound. As an anodic EC compound, an aromatic amine derivative, in particular, a dihydrophenazine derivative may be used. A cathodic EC compound may be a pyridine derivative, in particular, a viologen derivative or a compound having a plurality of similar pyridinium ions in the molecule. The typical absorption peak wavelength regions of the chromatic forms of these compounds are 450 to 550 nm in the dihydrophenazine derivative and 400 to 450 nm and 600 to 740 nm in the viologen derivative. Accordingly, in anodic charge imbalance in which an anodic EC compound remains, among R (red), G (green), and B (blue), an image with reduced signals of B and G is frequently obtained. In cathodic charge imbalance in which a cathodic EC compound remains, an image with reduced signals of R and B is frequently obtained.

In the image pickup apparatus of the present disclosure, image processing for compensating absorption of the chromatic form of the EC compound used in such an EC element is performed. This image processing is for, for example, color or luminance. Specifically, image processing is performed by selecting parameters to be used in compensation depending on the degree of charge imbalance and polarity (anodic or cathodic). Specifically, for example, regarding color, image processing is performed in the direction of relatively increasing a signal corresponding to the absorption region of the chromatic form of the EC compound among R, G, and B, and regarding luminance, image processing is performed in the direction of compensating a decrease in luminance due to absorption of the chromatic form of the EC compound. Regarding color, for example, white balance and color balance are adjusted. As an example, image processing by white balance correction when anodic charge imbalance occurs will now be described. In a charge imbalance achromatic defect when a chromatic form of a dihydrophenazine derivative remains, as described above, an image with reduced signals of B and G is obtained. In the image pickup apparatus, the degree of charge imbalance is detected by applying a voltage lower than the voltage causing a substantial change in the transmittance of the EC layer and measuring the charge imbalance current. In order to compensate the decreased B signal, the B gain is increased, and in order to compensate the relatively increased R signal, the R gain is decreased. The changing quantity of the gain at this time may be the value calculated in advance from a spectrum of the EC compound used in the EC element. The polarity of the charge imbalance appearing in the EC element used in the image pickup apparatus of the present disclosure is often determined by the combination of EC compounds used in the EC layer. For example, in an endurance test of an EC element using a dihydrophenazine derivative as the anodic EC compound and using a viologen derivative as the cathodic EC compound, charge imbalance in which the chromatic form of the anodic EC compound remains often appears. However, charge imbalance with polarity opposite to normal tendency may occur depending on the combination of EC compounds and driving conditions. The method of measuring the current value at the time of applying a voltage lower than the voltage causing a substantial change in the transmittance of the EC layer used in the image pickup apparatus of the present disclosure can easily obtain information relating to the degree of charge imbalance but is not good at discriminating the polarity of charge imbalance. As the method of discriminating the polarity of charge imbalance, the color information of signals acquired by the image pickup device is preferably used. Specifically, when a signal corresponding to the absorption region of the chromatic form of the EC compound with one polarity among R, G, and B is relatively decreased at the time of, for example, photographing a photographic subject, it is defined that charge imbalance in which the chromatic form of the EC compound with the polarity corresponding to absorption that corresponds to the attenuation of the signal is occurring. As the photographic subject at this time, a reference photographic subject is preferably used. In an example of an EC element using a dihydrophenazine derivative as the anodic EC compound and using a viologen derivative as the cathodic EC compound, it is described as follows. When an image with relatively decreased signals of B and G is obtained, charge imbalance in which the chromatic form of an anodic EC compound remains is occurring. When an image with a relatively decreased signal of R is obtained, charge imbalance in which the chromatic form of a cathodic EC compound remains is occurring. It is possible to more accurately detect the charge imbalance state of an EC element by using discrimination of the polarity of the charge imbalance in addition to detection of the degree of the charge imbalance state by measuring the current value to be used in the image pickup apparatus of the present disclosure. It is possible to compensate the achromatic defect of an EC element (the light absorption of an EC compound) and to improve the quality of picked-up images by performing image processing for compensating the absorption of the chromatic form of the EC compound based on the accurate detection of the charge imbalance state.

Effect

In the image pickup apparatus of the present disclosure, charge imbalance is detected based on the current flowing between the first electrode and the second electrode of the EC element when a voltage lower than the voltage causing a substantial change in the transmittance of the EC layer is applied between the first electrode and the second electrode of the EC element. It is possible to reduce the influence of an achromatic defect on the picked-up image by performing image processing relating to, for example, color or luminance to compensate the achromatic defect resulted from the charge imbalance, specifically, the light absorption of the EC compound.

The method of the present disclosure has the following characteristics:

A charge imbalance state of an EC element can be electrically detected without requiring a specific configuration such as a reference light source and a reference photographic subject;

The influence on the picked-up image due to charge imbalance can be reduced without changing the characteristics of the EC element; and The method for detecting a charge imbalance state uses the characteristics of a solution-type EC element in which an EC compound is dissolved in a solvent. Accordingly, it is difficult to apply the method to a fixed-type EC element in which an EC compound is fixed to an electrode and a deposition-type EC element in which an EC compound deposits on an electrode. It is similarly difficult to apply the method to an electrodeposition element in which a metal deposits on an electrode.

EXAMPLES

Example 1

The present disclosure will now be further specifically described by Examples but is not limited to these Examples.

Specific examples of the anodic EC compound and the cathodic EC compound used in Examples are shown below. Formulae (2) to (4) are anodic EC compounds, and Formulae (5) to (7) are cathodic EC compounds. However, the EC compound that is used in the present disclosure is not limited thereto. These anodic EC compounds being aromatic amine derivatives and dihydrophenazine derivatives and cathodic EC compounds being pyridine derivatives and viologen derivatives were synthesized by the methods described in International Publication No. WO 2020/121845.

(2)

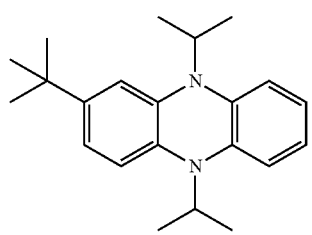

(3)

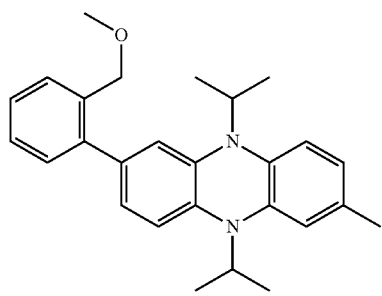

(4)

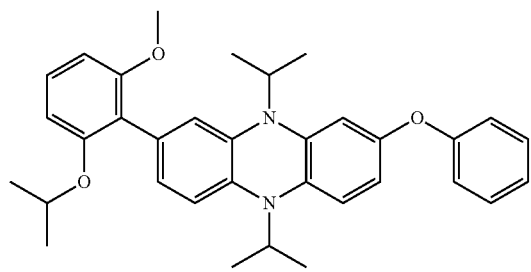

(5)

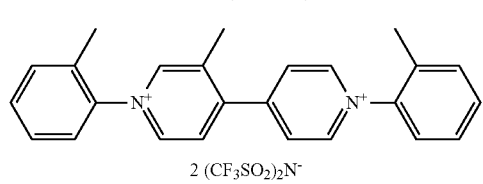

2 (CF$_3$SO$_2$)$_2$N$^-$ (6)

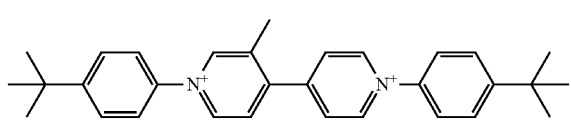

2 (CF$_3$SO$_2$)$_2$N$^-$ (7)

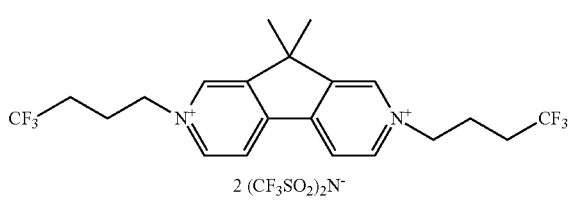

2 (CF$_3$SO$_2$)$_2$N$^-$

Production of EC Element

The EC element having a configuration shown in FIG. 2 was produced by the following process.

(1) Production of EC element configuration: Two plates of transparent electroconductive glass (a first basal plate 26 and a second basal plate 27) each provided with an indium-doped tin oxide (ITO) film were prepared. Subsequently, a thermosetting epoxy-based adhesive mixed with spacer beads of 30 μm was applied to the periphery of the transparent electroconductive glass as a sealing material. The two plates of the transparent electroconductive glass were then stacked such that the ITO films (becoming a first electrode 21 and a second electrode 22) face to each other and were heated to cure the adhesive. Consequently, the basal plate 26 and the basal plate 27 were bonded to each other. Incidentally, the sealing material was applied to the periphery excluding a part thereof for forming an injection hole.

(2) injection of electrolyte solution: An anodic EC compound and a cathodic EC compound were dissolved in a propylene carbonate containing 10 wt % of PMMA (polymethyl methacrylate) as a thickener such that the concentration in a light reduced state was that described in Table 1.

TABLE 1

| | EC compound | | | | | |
|---|---|---|---|---|---|---|
| | (2) | (3) | (4) | (5) | (6) | (7) |
| Concentration | 8.0 | 34.6 | 23.3 | 0.7 | 15.9 | 49.3 |

Subsequently, the electrolyte solution was injected into the EC element configuration from the injection hole, followed by sealing with the light thermosetting epoxy-based adhesive to obtain six EC elements. These EC elements had a maximum absorbance of 2.4 as an average in 425 to 680 nm.

Figure 7:
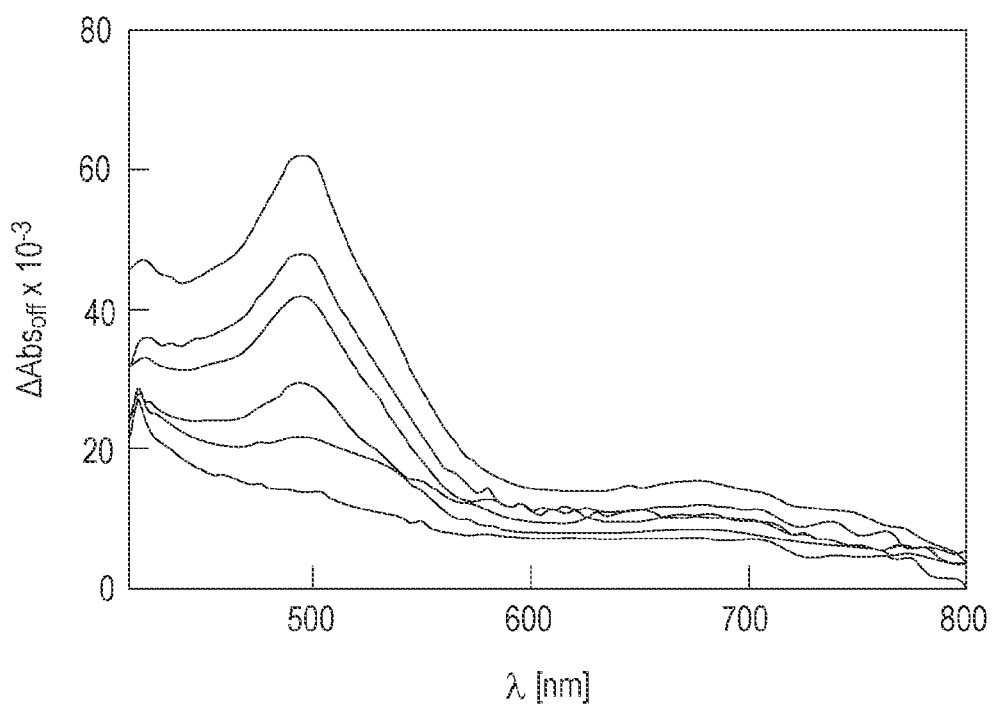
FIG. 7 is a graph showing absorbance spectra of color remaining of EC elements after an endurance test.

(3) Endurance driving of EC element: A voltage of 0.7 V was applied between the first electrode and the second electrode of the EC element in a constant temperature and humidity chamber of 60° C. and 90% RH to form a chromatic state, and after 500 hours, the first electrode and the second electrode were short-circuited to decolor. An EC element was installed in front of the image pickup device of an image pickup apparatus equipped with a lens, and a change in the white balance gain by endurance driving when an achromatic reference photographic subject was photographed under artificial solar light irradiation was evaluated by simulation. In this image pickup apparatus, an image pickup device that acquires signals for light of three colors R, G, and B was used. As a result, it was demonstrated that endurance driving decreased the R gain and increased the B gain. It was judged from the decrease of the R gain and the increase of the B gain (the light absorption in the R region was relatively low, and the light absorption in the B region was relatively high) that charge imbalance in which the chromatic form of an anodic EC compound remains occurred, which was used in correction of image processing. FIG. 7 shows spectra of absorbance difference at the time of decoloring (absorbance of color remaining, ΔAbsoff) obtained by subtracting the absorbance at the time of decoloring before endurance driving of the EC element from the absorbance at the time of decoloring (short circuit) after endurance driving. As a result, it was demonstrated that in a plurality of EC elements, color remaining mainly due to absorption of an anodic EC compound having a peak near 500 nm occurred, although the degree varies.

(4) Measurement of charge imbalance current and calculation of correction coefficient: A voltage of 0.15 V was applied between the first electrode and the second electrode of the EC element and was kept for 10 seconds, and the steady current flowing between the first electrode and the second electrode was measured. The absorbance change obtained by subtracting the absorbance at the time of short circuit (decoloring) from the absorbance at the time of application of a voltage of 0.15 V was lower than the measuring lower limit of a spectrometer and was lower than $\frac{1}{1000}$ of the maximum absorbance of the EC element. The voltage giving the steady current (iic), which is the ordinate intercept of the absorbance change-current profile, was 0.315 V.

Figure 8:
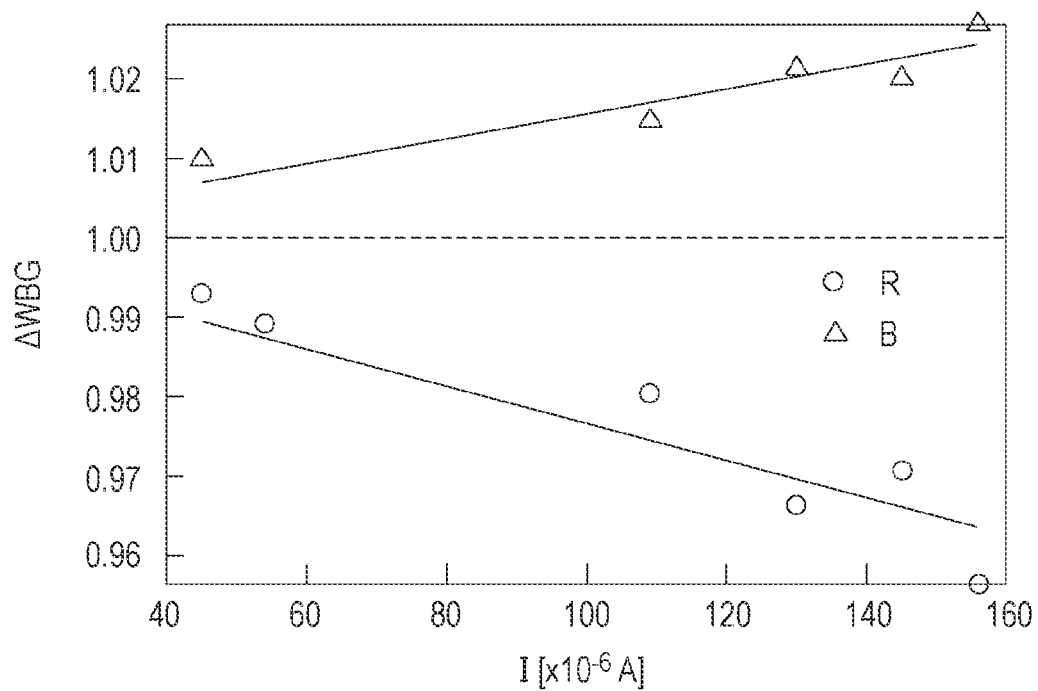
FIG. 8 is a graph showing a relationship between the white balance gain change and the charge imbalance current.

An EC element was installed in front of the image pickup device of an image pickup apparatus equipped with a lens, and a change in the white balance gain by endurance driving when an achromatic reference photographic subject was photographed under artificial solar light irradiation was evaluated by simulation. FIG. 8 shows a relationship between the white balance gain change (no change is defined as 1: vertical axis) and the charge imbalance current (steady current: horizontal axis). As a result, it was demonstrated that the R gain linearly decreases with progress of charge imbalance and that the B gain linearly increases with progress of charge imbalance. The correction coefficient was calculated from these straight lines and was used in image processing.

(5) Image processing using correction coefficient: Regarding the influence of a charge imbalance achromatic defect on an image (white balance gain change), a change by image processing will be described. As the image processing, white balance gain correction for achromatic defect resulting from charge imbalance in which the chromatic form of an anodic EC compound remains was performed in the control unit using the relationship between the charge imbalance current and the white balance gain change calculated in the previous section. Regarding the influence on the white balance gain change of a picked-up image by the charge imbalance achromatic defect of an EC element after endurance driving compared to the EC element in the achromatic state before the endurance driving, Table 2 shows the amounts before and after image processing and the suppressed amount by the image processing.

compounds generated at the first electrode and the second electrode flows when a voltage lower than the voltage causing a substantial change in the transmittance of the EC layer is applied between the first electrode and the second electrode.

(B) The achromatic defect of an EC element (the light absorption of an EC compound) is compensated by performing image processing based on the charge imbalance current that is proportional to the amount of the chromatic form of the EC compound remaining at the time of decoloring to improve the quality of picked-up images.

(C) Image processing is performed by discriminating the polarity of charge imbalance based on the ratio of signals for light of three colors R, G, and B and the charge imbalance current to improve the quality of picked-up images.

Example 2

An example of image processing based on impedance will be described.

(1) Measurement of Impedance

Figure 9:
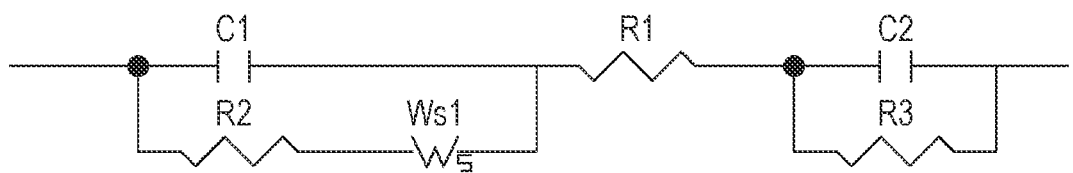
FIG. 9 is a circuit diagram for calculating a correction coefficient.

EC element production and endurance driving were performed as in Example 1. An AC voltage of ±10 mV with short circuit as 0 V was applied between the first electrode and the second electrode of this EC element within a range of from 100 kHz and 1 Hz, and impedance was calculated from the current flowing at that time. On this occasion, the maximum absorbance change of the EC element was $\frac{1}{1000}$ or less. The resulting impedance was subjected to fitting with the equivalent circuit shown in FIG. 9, and the correction coefficient was calculated using the resulting charge transfer resistance R2. In FIG. 9, C1 and C2 are condensers, and R1, R2, and R3 are resistors, and Ws1 is a Warburg element.

Figure 10:
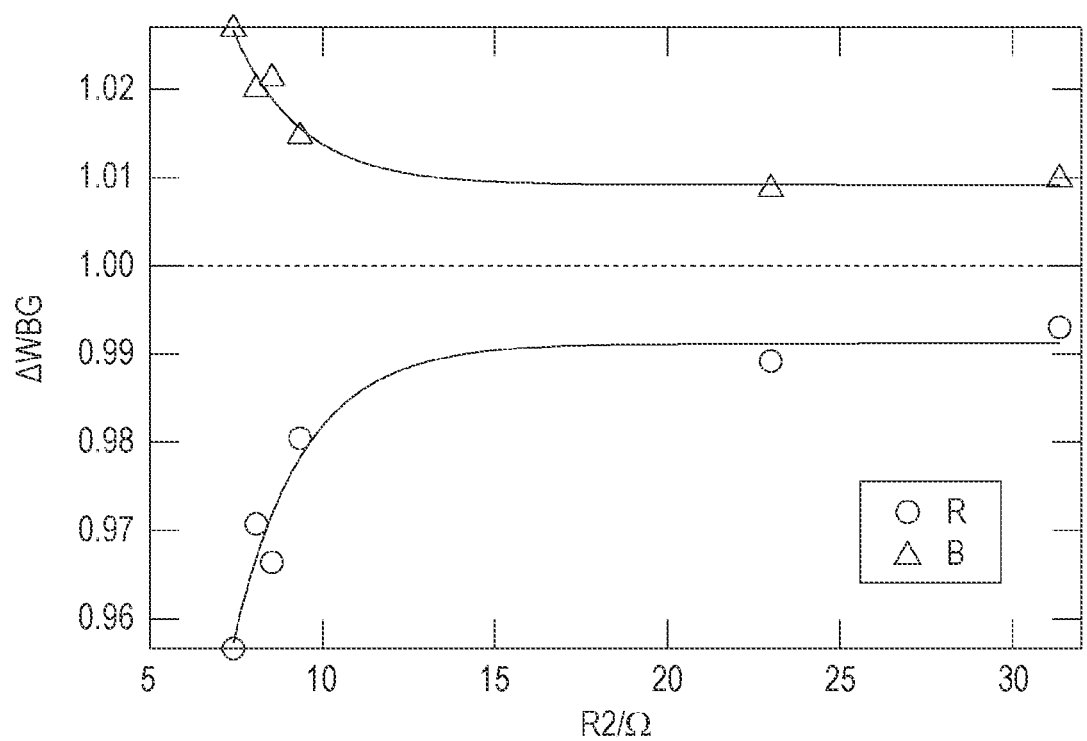
FIG. 10 is a graph showing a relationship between a balance gain change and a charge transfer resistance.

(2) Measurement of Charge Imbalance Current and Calculation of Correction Coefficient A change in the white balance gain by endurance driving was evaluated by simulation as in Example 1. FIG. 10 shows a relationship between the white balance gain change (no

TABLE 2

|  | R gain | | | B gain | | |
| --- | --- | --- | --- | --- | --- | --- |
|  | Before image processing | After image processing | Suppressed amount | Before image processing | After image processing | Suppressed amount |
| Sample 1 | 0.966 | 1.001 | 0.033 | 1.021 | 0.997 | 0.018 |
| Sample 2 | 0.957 | 1.002 | 0.041 | 1.027 | 0.993 | 0.019 |
| Sample 3 | 0.989 | 1.000 | 0.011 | 1.009 | 1.002 | 0.007 |
| Sample 4 | 0.980 | 0.998 | 0.017 | 1.015 | 1.006 | 0.009 |
| Sample 5 | 0.971 | 0.997 | 0.027 | 1.020 | 1.005 | 0.015 |
| Sample 6 | 0.993 | 1.003 | 0.004 | 1.010 | 1.004 | 0.006 |

The white balance change that was 4.3% (Sample 2) at the maximum before the image processing decreased to 0.7% (Sample 2) at the maximum after the image processing. It was confirmed that in all samples, white balance change was suppressed to improve the quality of picked-up images.

The following effects were confirmed by Examples.

(A) In a complementary-type EC element in which the oxidized form and the reduced form of an EC compound are both dissolved in a solvent, a charge imbalance achromatic defect occurs. At that time, a charge imbalance current generated by a reaction between the oxidized form and the reduced form of homopolar EC change was defined as 1: vertical axis) and the charge transfer resistance R2 (horizontal axis). As a result, it was demonstrated that the R gain and the B gain exponentially change with progress of charge imbalance. This curve was used in image processing as a correction coefficient.

(3) Image Processing Using Correction Coefficient

Regarding the influence of a charge imbalance achromatic defect on an image (white balance gain change), a change by image processing will be described. As the image processing, white balance gain correction for achromatic defect resulting from charge imbalance in which the chromatic form of an anodic EC compound remains was performed in the control unit using the relationship between the charge imbalance current and the white balance gain change calculated in the previous section. Regarding the influence on the white balance gain change of a picked-up image by the charge imbalance achromatic defect of an EC element after endurance driving compared to the EC element in the achromatic state before the endurance driving, Table 3 shows the amounts before and after image processing and the suppressed amount by the image processing.

TABLE 3

Influence on white balance gain change of picked-up image by charge imbalance achromatic defect: Amounts before and after image processing and suppressed amount by image processing

|  | R gain | | | B gain | | |
| --- | --- | --- | --- | --- | --- | --- |
|  | Before image processing | After image processing | Suppressed amount | Before image processing | After image processing | Suppressed amount |
| Sample 1 | 0.972 | 0.995 | 0.023 | 1.019 | 1.002 | −0.017 |
| Sample 2 | 0.957 | 0.999 | 0.042 | 1.027 | 1.000 | −0.026 |
| Sample 3 | 0.991 | 0.998 | 0.007 | 1.009 | 0.999 | −0.010 |
| Sample 4 | 0.978 | 1.002 | 0.024 | 1.016 | 0.999 | −0.017 |
| Sample 5 | 0.967 | 1.004 | 0.037 | 1.022 | 0.998 | −0.023 |
| Sample 6 | 0.991 | 1.002 | 0.011 | 1.009 | 1.001 | −0.009 |

The white balance change that was 4.3% (Sample 2) at the maximum before the image processing decreased to 0.5% (Sample 1) at the maximum by the image processing. It was confirmed that in all samples, white balance change was suppressed to improve the quality of picked-up images.

This Example demonstrated the following effects.

(A) The quality of picked-up images is improved by performing image processing based on the impedance calculated from the current that flows when an AC voltage lower than a voltage that generates a substantial change in the transmittance of the electrochromic layer is applied between the first electrode and the second electrode.

Example 3

An example of correcting the temperature change will be described.

(1) Calculation of Temperature Correction Coefficient

Regarding an EC element similar to Example 1, the temperature dependence on steady current when a voltage of 0.15 V was applied between the first electrode and the second electrode of the EC element was measured. As a result, the current value when the temperature of the electrochromic element was 40° C. was 1.50 times that at 25° C.

(2) Measurement of Current

A temperature sensor was installed on the surface of an EC element subjected to endurance driving as in Example 1, and the EC element was incorporated into an image pickup apparatus. The current when the element temperature was 40° C. was measured by the same method as in Example 1.

(3) Image Processing Using Correction Coefficient Obtained by Temperature Correction Using Temperature Correction Coefficient The current value at 25° C. was estimated from the current value measured at 40° C. using the calculated temperature correction coefficient, white balance gain correction was performed using the obtained value by the same method as in Example 1. Regarding the influence on the white balance gain change of a picked-up image by the charge imbalance achromatic defect of an EC element after endurance driving compared to the EC element in the achromatic state before the endurance driving, Table 4 shows the amounts before and after image processing and the suppressed amount by the image processing.

TABLE 4

Influence on white balance gain change of picked-up image by charge imbalance achromatic defect:
Amounts before and after image processing and suppressed amount by image processing

|  | R gain | | | B gain | | |
| --- | --- | --- | --- | --- | --- | --- |
|  | Before image processing | After image processing | Suppressed amount | Before image processing | After image processing | Suppressed amount |
| Sample 1 | 0.972 | 0.998 | 0.026 | 1.019 | 1.000 | −0.019 |
| Sample 2 | 0.957 | 0.993 | 0.036 | 1.027 | 1.003 | −0.024 |
| Sample 3 | 0.991 | 1.002 | 0.011 | 1.009 | 1.000 | −0.009 |
| Sample 4 | 0.978 | 1.005 | 0.027 | 1.016 | 0.998 | −0.018 |
| Sample 5 | 0.967 | 1.001 | 0.034 | 1.022 | 1.000 | −0.022 |
| Sample 6 | 0.991 | 1.004 | 0.013 | 1.009 | 1.002 | −0.007 |

The white balance change that was 4.3% (Sample 2) at the maximum before the image processing decreased to 0.5% (Sample 4) at the maximum by the image processing. It was confirmed that in all samples, white balance change was suppressed to improve the quality of picked-up images.

This Example demonstrated the following effects.

(A) The quality of picked-up images is improved by installing a temperature sample that detects the temperature of an electrochromic element on an image pickup apparatus and by performing image processing based on the detected temperature and current.

According to the present disclosure, provided is an image pickup apparatus in which the influence of an achromatic defect due to charge imbalance is suppressed by using a method that can electrically detect the achromatic defect due to charge imbalance in a solution-type EC element.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-195658, filed Nov. 26, 2020 and No. 2021-163848, filed Oct. 5, 2021, which are hereby incorporated by reference herein in their entirety.

What is claimed is:

1. An image pickup apparatus comprising:
an electrochromic element including a first electrode, a second electrode, and an electrochromic layer disposed between the first electrode and the second electrode, wherein
the electrochromic layer includes a solvent and an anodic redox substance and a cathodic redox substance dissolved in the solvent, and
at least one of the anodic redox substance and the cathodic redox substance is an electrochromic compound, where
the image pickup apparatus performing image processing based on a current flowing between the first electrode and the second electrode when a voltage lower than the voltage causing a substantial change in the transmittance of the electrochromic layer is applied between the first electrode and the second electrode.

2. The image pickup apparatus according to claim 1, wherein
the image processing relates to color or luminance.

3. The image pickup apparatus according to claim 1, wherein
the image processing compensates an achromatic defect of the electrochromic element.

4. The image pickup apparatus according to claim 1, wherein
the image processing compensates light absorption of the electrochromic compound.

5. The image pickup apparatus according to claim 1, wherein
the image pickup apparatus compensates light absorption of the electrochromic compound remaining in an amount proportional to the current.

6. The image pickup apparatus according to claim 1, wherein
the electrochromic compound is a low molecular organic compound.

7. The image pickup apparatus according to claim 1, wherein
the anodic redox substance is the electrochromic compound with anode properties and is an aromatic amine derivative.

8. The image pickup apparatus according to claim 7, wherein
the aromatic amine derivative is a dihydrophenazine derivative.

9. The image pickup apparatus according to claim 1, wherein
the cathodic redox substance is the electrochromic compound with cathodic properties and is a pyridine derivative.

10. The image pickup apparatus according to claim 1, wherein
an oxidized form and a reduced form of the electrochromic compound are both dissolved in the solvent.

11. The image pickup apparatus according to claim 1, wherein
the current is a current generated by a reaction between an oxidized form and a reduced form of homopolar electrochromic compounds generated at the first electrode and the second electrode.

* * * * *